H. WALKER.
EXTRA TIRE CARRIER.
APPLICATION FILED APR. 3, 1919.
1,330,102.
Patented Feb. 10, 1920.
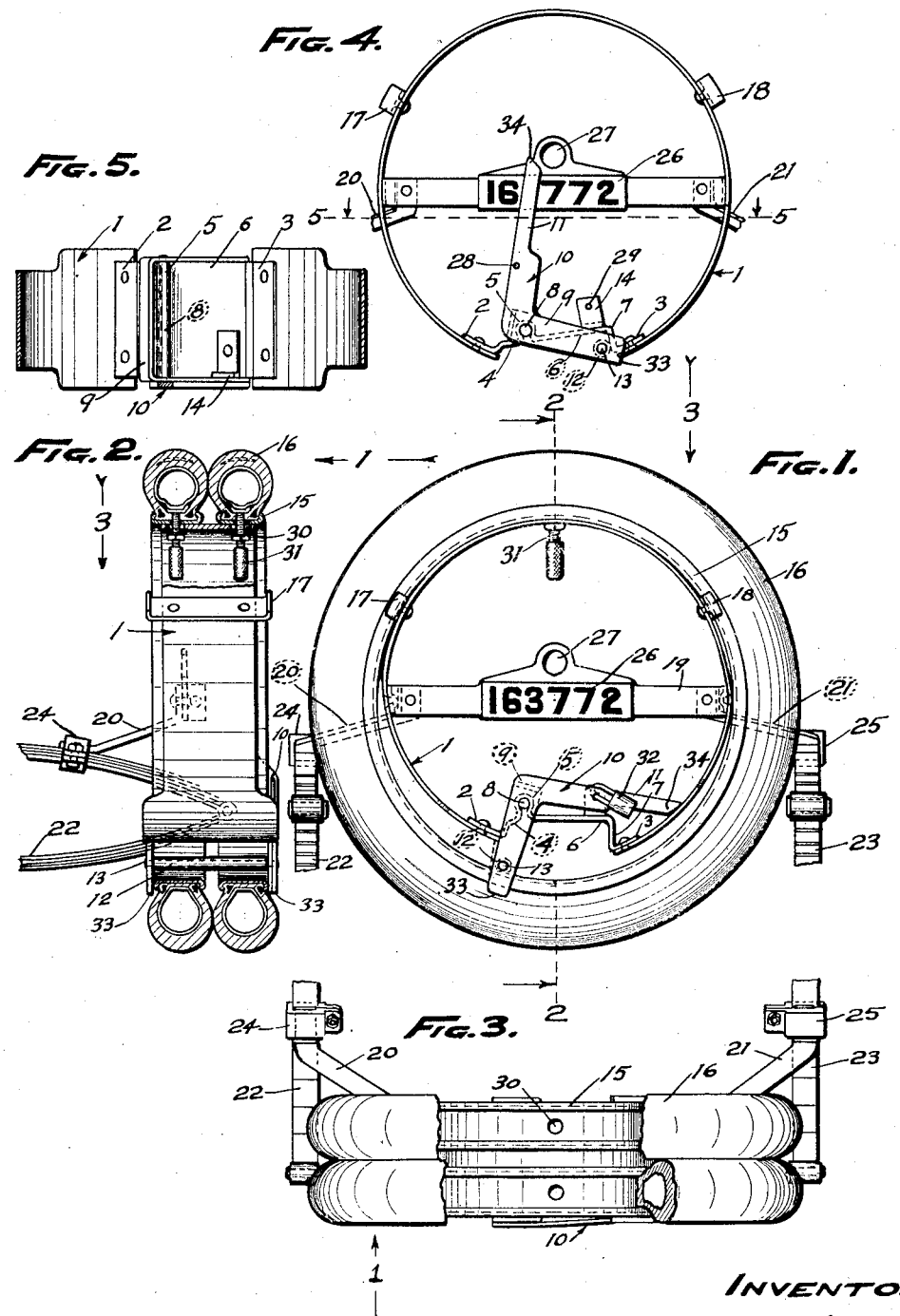
INVENTOR.
HARRY WALKER.
By Hazard & Miller
ATTORNEYS.

UNITED STATES PATENT OFFICE.

HARRY WALKER, OF ANAHEIM, CALIFORNIA.

EXTRA-TIRE CARRIER.

1,330,102.

Specification of Letters Patent. Patented Feb. 10, 1920.

Application filed April 3, 1919. Serial No. 287,181.

*To all whom it may concern:*

Be it known that I, HARRY WALKER, a citizen of the United States, residing at Anaheim, in the county of Orange and State of California, have invented new and useful Improvements in Extra-Tire Carriers, of which the following is a specification.

My object is to make an extra tire carrier, and my invention consists of the novel features herein shown, described and claimed.

Figure 1 is a rear elevation showing a tire carrier embodying the principles of my invention in use, the view being taken looking in the direction indicated by the arrows 1 in Figs. 2 and 3.

Fig. 2 is a fragmentary cross section on the line 2—2 of Fig. 1.

Fig. 3 is a fragmentary top plan view looking in the direction indicated by the arrows 3 in Figs. 1 and 2, parts being broken away to show the construction.

Fig. 4 is a rear elevation of the tire carrier in position to receive a tire, the tires and carrier mounting being omitted.

Fig. 5 is a sectional detail on the line 5—5 of Fig. 4 and looking downwardly as indicated by the arrows.

The flat metal band 1 makes nearly a circle and the ends of the band are connected by a brace comprising attaching plates 2 and 3 riveted to the ends of the band, an arm portion 4 extending from the plate 2, a bearing portion 5 formed integral with the arm portion 4, the extension portion 6 leading from the bearing portion, and the arm portion 7 connecting the portion 6 to the plate 3. The bearing portion 5 is some distance inside of the circle of the band. A shaft 8 is mounted in the bearing portion 5, a U-shaped frame 9 is pivotally mounted upon the shaft 8, a locking bar 10 extends from the frame 9 at right angles, and a handle 11 extends from the locking bar 10. A roller 12 is placed between the ends of the frame 9, and a shaft 13 is inserted through the roller and the frame, the roller being outside of the extension portion 6, and the locking bar 10 and handle 11 extending inwardly. A second locking bar 14 is secured to the portion 6 and extends inwardly. The band 1 is small enough to fit loosely within the rims 15 of the tires 16 to be carried.

Crosspieces are riveted to the band 1 with their ends turned outwardly to form the stops 17 and 18 to hold the tire rims upon the band, the stops being located substantially one-third of a circle each way from the roller 12. A supporting bar 19 extends diametrically across the band 1 with the roller 12 at the lower side, and the ends of the bar are bent inwardly and riveted to the band, and the ends of the bar 19 are riveted to the supporting brackets 20 and 21, and the supporting brackets are connected to the springs 22 and 23 by clamps 24 and 25. The ends of the shaft 8 and the ends of the shaft 13 are securely riveted, or upset, and all the parts are riveted together so they cannot be removed or separated except by cutting or breaking. The license plate 26 may be riveted upon the supporting bar 19 and the tail light 27 mounted above the license plate. Perforations 28 and 29 are formed in the locking bars 10 and 14.

The tires 16 are mounted upon rims 15 with the inner tubes in place ready for use, and holes 30 are formed through the band 1 at the opposite side of the band from the roller 12. The handle 11 is swung inwardly, as shown in Fig. 4, and the rims carrying the tires are placed in position with the valves 31 extending through the holes 30; then the handle 11 is operated and swung downwardly to the position shown in Fig. 1, thereby pressing the roller 12 outwardly against the rims to tighten the rims upon the band 1 and bring the perforations 28 and 29 into registration, and then the padlock 32 is applied.

The ends 33 of the frame 9 extend beyond the roller 12 to make stops to straddle the rims 15 and hold the rims from being moved sidewise off the band, the same as the stops 17 and 18 hold the rims.

It is obvious that the extra tires are securely mounted for carrying and that the extra tires cannot be removed from the carrier by an unauthorized person without breaking the parts, or picking the lock. The roller is mounted so as to be manipulated with considerable leverage by operating the handle 11 so as to draw the tight parts tight within the tire rims and hold the tires from rattling.

The extreme end 34 of the handle 11 strikes the inner face of the band 1 at the same time as the roller 12 passes beyond the radial line of the bearing 5, and at this time the band 1 and all the parts are under strain to hold the tires tightly in place.

The mounting of the supporting bar 19 upon an automobile, or the like, may be varied with various automobiles, and the specific mounting is not an essential part of this invention.

Various changes may be made without departing from the spirit of my invention as claimed:

I claim:

1. An extra tire carrier comprising a band forming nearly a circle, a brace connecting the ends of the band inside of the circle, a bearing in the brace, a U-shaped frame pivotally connected to the bearing with the ends outside of the brace swinging outwardly, a roller between the ends, a handle extending inwardly from the frame, a locking bar extending inwardly from the brace, stops extending outwardly from the band, and stops extending outwardly from the frame beyond the roller.

2. In an extra tire carrier, a band forming nearly a circle, a brace connecting the ends of the band inside of the circle, a bearing in the brace, a U-shaped frame pivotally connected to the bearing with the ends swinging outwardly, a roller between the ends of the frame outside of the brace, a handle extending inwardly from the frame and adapted to strike the inner face of the band when the roller swings outwardly, stops extending outwardly from the band, stops extending outwardly from the frame beyond the roller, and means for locking the handle to hold the roller in its outward position.

In testimony whereof I have signed my name to this specification.

HARRY WALKER.